United States Patent
Alperovich et al.

(10) Patent No.: US 6,682,799 B1
(45) Date of Patent: Jan. 27, 2004

(54) ORGANIC RECORDING MEDIUM FOR FLUORESCENT WORM DISKS

(75) Inventors: Mark Alperovich, Ashdod (IL); Irene Zuhl, Ashdod (IL); Eugene Levich, New York, NY (US); Arkady Khaikin, Holon (IL)

(73) Assignee: Valdas Ltd. (A British Virgin Island Corp.), New York, NY (US)

( * ) Notice: Subject to any disclaimer, the term of this patent is extended or adjusted under 35 U.S.C. 154(b) by 0 days.

(21) Appl. No.: 09/787,293

(22) PCT Filed: Sep. 17, 1999

(86) PCT No.: PCT/US99/21288

§ 371 (c)(1),
(2), (4) Date: Apr. 20, 2001

(87) PCT Pub. No.: WO00/15425

PCT Pub. Date: Mar. 23, 2000

Related U.S. Application Data

(60) Provisional application No. 60/100,726, filed on Sep. 17, 1998.

(51) Int. Cl.⁷ .................................................. B32B 3/02
(52) U.S. Cl. ..................... 428/64.1; 428/64.4; 428/690; 430/270.14; 430/270.18
(58) Field of Search .............................. 428/64.1, 64.4, 428/64.8, 690, 913; 430/270.14, 270.15, 270.18, 495.1, 945

(56) References Cited

U.S. PATENT DOCUMENTS

| | | | |
|---|---|---|---|
| 4,864,537 A | 9/1989 | Michl et al. | 365/127 |
| 5,348,841 A | 9/1994 | Tao et al. | 430/270 |
| 5,370,970 A | 12/1994 | Tanaka et al. | 430/273 |
| 5,492,744 A | 2/1996 | Koike et al. | 428/641 |
| 5,606,546 A | 2/1997 | Best et al. | 369/275.1 |
| 5,633,106 A | 5/1997 | Aihara et al. | 430/21 |
| 5,658,707 A * | 8/1997 | Takuma | 430/270.15 |
| 5,855,979 A | 1/1999 | Umchara et al. | 428/64.1 |

* cited by examiner

*Primary Examiner*—Elizabeth Mulvaney
(74) *Attorney, Agent, or Firm*—Blank Rome LLP

(57) ABSTRACT

A dye-in-polymer composition for in fluorescent WORM discs comprises about 0.1 to 10% by weight of a fluorescent dye capable of absorbing laser radiation and transforming the absorbed light into heat; about 10 to 80% by weight of nitrocellulose and a film forming polymer. The dye containing solution is applied to substrate of an optical reading medium by a spin, roller or dip coating. The method utilizes a focused laser beam for scanning the recording layer.

44 Claims, No Drawings

ORGANIC RECORDING MEDIUM FOR FLUORESCENT WORM DISKS

This application claims the benefit of provisional application Serial 60/100,726 filed Sep. 17, 1998.

FIELD OF THE INVENTION

This invention is related to the field of media for WORM optical discs with fluorescent reading, providing high capacity optical memory, including 3-dimensional optical memory systems.

BACKGROUND OF THE INVENTION

Recently WORM optical memory devices have experienced great evolution, providing recording of data with the possibility of its immediate reading. This feature—data recording in a real-time regime—is significant for various applications of optical recording in memory devices, especially for computer systems. For this field duplication of data is not so essential.

All WORM optical media of practical interest is based on a photo thermal principle of recording [1]. The data on such media is recorded by scanning the recording layer with the focused laser beam. The laser power is absorbed by the active medium of the layer and transformed into thermal energy, causing its physical and chemical changes, which can be optically registered at reading. Photochemical effects can also be used, i.e., optically detected changes in the state of medium, caused by direct interaction of photons with this medium. The efforts are made to use photosensitive medium for photochemical recording on WORM discs. Hence, until now there was no practical application for WORM discs with a photon mechanism of recording. The reason can be the non threshold nature of photochemical recording on the contrary to photo thermal recording at the same laser for recording and reading (with different laser power). Therefore, the photochemical recording cannot provide the necessary stability of medium characteristics at multiple reading. According to the mechanisms of thermally induced effects, the photo thermal recording on WORM optical medium with practical applications can be divided in two parts: ablative, providing optically registered geometric changes in the thin active layer during its melting, evaporation or chemical transformations, and with phase change, which does not provide geometric changing of the active layer, otherwise changing its optical constants, that causes optical contrast, which is usually not high for these materials.

Among various types of medium for ablative recording, WORM optical discs with thin (10–100 nm) layers of organic dyes with or without dye-in-polymer are of special interest. Layers of organic dyes provide a range of sufficient advantages in comparison to metal or half-metal layers, used in WORM discs with ablative recording. Such advantages are the following: dyes may have a stronger selective absorption on the recording laser wavelength; dye layers are more sensitive to the laser radiation because of their small thermal conductivity and low temperature of melting or decomposition. That provides a higher recording capacity; dye layers provide a higher stability at higher humidity. Medium based on layers has better signal-to-noise ratios, because of the lack of noise, provided by amorphous layers. The procedure of coating the layers in the centrifuge makes this method more simple and cheap than vacuum deposition used for obtaining metal and half-metal layers on WORM discs.

The existing WORM optical discs based on organic dyes have a capacity up to 3.5 GB. For the WORM discs with one recording layer said optical memory capacity is the utmost or, at least for the diode laser with 780–830 nm wavelengths. Future increasing the capacity for WORM discs is possible with the use of three-dimensional optical memory carriers with multilayer data recording and fluorescent reading [2,3]. Fluorescent reading offers a range of sufficient advantages in comparison to reading, based on the changes in the reflection ratio, even in the single-layer systems. One of the advantages is the reduced tolerance for the sizes of recorded pits in comparison to the existing WORM discs. For example, changing the size on a hundred nm does not influence the reading from a fluorescent disc, while it totally eliminates the signal from reflective discs. Another advantage is the reduced sensitivity of fluorescent discs to changing the slope up to one grad that is absolutely intolerable for reflective discs. Nevertheless, the basic advantage of fluorescent reading is its most fitness for three-dimensional optical memory carriers, i.e., multilayer discs.

The use of layers of organic dyes with ablative recording in such medium is not possible due to owing to the following reasons: Reading is performed by laser beam, scanning the change of the reflection in the pre-irradiated spots. In the multilayer system, this method causes a strong fall of the reading quality, becoming dramatic for systems with more than four active layers. Changes in the geometrical structure of the layer under the heat influence during recording, such as: burning out of holes, creation of bubbles, change of surface texture, etc. are also unsuitable for multilayer medium, as it causes dispersion of the reading beam, hence abruptly lowering the detection quality. The dye concentration in the recording layer of the existing WORM discs is the utmost (up to 99%). In this case, the dye fluorescence is usually suppressed because of high concentration. In the thin dye layers (10–100 nm) of the existing WORM discs, the local heating of the medium at recording can reach 700° C. Such high temperature makes it difficult to avoid changing the geometrical structure of the layer. Increasing the thickness of the dye layer up to 200 nm and more by using polymer dye at preserving the surface concentration of dye, leads to lowering the local heating temperature and allows to prevent the layer deformation. It also provides the appearance and growth of the dye fluorescence due to lowering the concentration suppression effect. However at all the same conditions the layer sensitivity to laser radiation is dramatically lowering, that leads to drop of recording speed and density.

Thus, all the known materials, used for single-layer optical WORM discs with reflective reading, as well as photo thermal recording methods cannot be used for multilayer optical WORM discs with fluorescent reading. Comparatively, thick layers (200 nm and more), containing fluorescent dyes, are also not likely suitable for multilayer medium creation without use of special ways and additives, providing an increase in recording speed and density.

SUMMARY OF THE INVENTION

Considering the above-stated, the purpose of this invention is to obtain a high-sensitive dye-in-polymer (DIP) medium for fluorescent WORM discs, providing high rates and density of photo thermal recording. The other purpose of the present invention is to provide a DIP medium with high sensitivity to the recording laser radiation in visual and infrared ranges. It is a further object of the invention to provide a DIP medium for single and multilayer materials with high optical memory capacity, high resolution and high darkness and radiation stability. In accordance with the object of the invention, the DIP medium is comprised of a fluorescent dye, capable to absorb the recording laser radiation and transform the absorbed light power into the heat, and nitrocellulose, capable to generate decomposition products under heating. According to the other purpose of the present invention, the above-stated DIP media contains a fluorescent dye, which generates non fluorescent dimers with sandwich structure, capable to absorb the recording laser radiation and transform it into heat, and nitrocellulose, capable to generate decomposition products under heating. According to the future purpose of the present invention, the above-mentioned nitrocellulose decomposition products cause the distinguishing of fluorescence or discoloring of the fluorescent dye, thus making the recording. If the recording laser radiation is absorbed by the monomer form of fluorescent dye, the same laser can be used for reading and recording (i.e., 650 nm, but with different power pulse). If the recording laser radiation is absorbed by the dimer form of fluorescent dye, the recording laser has a shorter wavelength (i.e., 635 nm).

DETAILED DESCRIPTION OF THE PREFERRED EMBODIMENTS

Following is the detailed description of the examples and the best model of the invention. In the first variance, the substrate is made in a form of transparent disc from a glass, polymethyl methacrylate, polycarbonate or polyethylene terephthalate and is covered with a recording layer, consisting of at least a fluorescent dye, capable to absorb the recording laser radiation and transform it into the heat, nitrocellulose, capable to generate decomposition products under heating, which discolor the dye or extinguish its fluorescence, and a film-forming polymer with high transparency, low heat conductivity and capable to provide the necessary quantum output of the dye fluorescence. Besides, the recording layer can contain compounds, impeding nitrocellulose decomposition, improving the dye stability at disc storage and reading, plastifier, etc. The thickness of the recording layer can be 100–1000 nm, preferably— 200–500 nm. Fluorescent dye with maximum absorption value near the recording laser wavelength is selected from the components related to the xanthene dyes of the eosine and rhodamine groups, acridine, oxazine, azine, perylene, violanthrole, cyanine, phthalocyanine dyes, indigo colors and porphyries. The content of the fluorescent dye in the layer is equal to 0.1–10%. The offered in the present invention optical recording composition contains nitrocellulose with 10.7 up to 12.5% nitrogen and polymerization rate (number of therificated glucose residues in a nitrocellulose macromolecule) within 150–300, the so-called lacquer collodion cotton. At the temperature above 80° C., the lacquer collodion cotton decomposes spontaneously, at that the decomposition rate grows quickly at raising temperatures. The lacquer collodion cotton decomposition is a self-accelerating process. The self-acceleration is especially significant in the presence of oxygen and traces of humidity [4]. The film-forming polymer is selected from a wide range of resins, such as cellulose esters, i.e., nitrocellulose, cellulose acetate, cellulose acetate butyrate; cellulose ethers, i.e., methyl cellulose, ethyl cellulose, butyl cellulose; vinyl resins, i.e., polyvinyl acetate, polyvinyl butyral, polyvinyl acetyl, polyvinyl alcohol and polyvinyl pyrrolidone; acrylic resins, i.e., polymethyl methacrylate, a polybutyl acrylate, a poly methacrylic acid, polyacrylilc amid polyacrylonitrile. But the most preferable are alkyd, urea-formaldehyde and melamine-formaldehyde resins, simple polyvinyl ethers and poly acrylic resins. Aliphatic, aromatic and heterocyclic amines, urea derivatives, or sulfur compounds can serve for nitrocellulose decomposition impeding. Film-forming properties of the used resins and the plasticity of the recording layer can be improved by adding to resins the proper plastifier, such as dibutyl phthalate, dioctyl phthalate or tricresyl phosphate. To create a recording layer of the present invention, the above-mentioned ingredients are dissolved in organic solvent or introduced in it as micro capsules less than 0.2 mkm in size, prepared by known methods, with future covering the substrate with this compound by spin coating, roller coating or dip coating. The organic solvent is usually selected from alcohols, ketone, amide, sulfoxides, ethers, esters, halogenated aliphatic hydrocarbons or aromatic solvents. Examples of such solvents include methanol, ethanol, iso-propanol, iso-butanol, tetrafluoro-ethanol, diacetone alcohol, methyl cellosolve, ethyl cellosolve, acetone, methylethylketone, cyclohexanone, N,N-dimethylformamide, N,N-dimethylacetamide, dimethylsulfoxide, tetrahydrofurane, dioxane, ethyl acetate, chloroform, methylene chloride, dichloroethane, toluene, xylene or their mixtures. In the other variant of realizing of this invention the fluorescent dye of the optical recording media forms non fluorescent dimers of sandwich structure with the maximum absorption value close to the recording laser wavelength. At recording, the non fluorescent dimers absorb the laser radiation and transform it into heat, which cause determination of nitrocellulose. Its determination products lead to fluorescence distinguishing or decoloration of the dye monomer form. The advantage of this variant is that non fluorescent dimers practically fully transfer the absorbed light power into heat. At the same time the fluorescent monomer form is realizing it only partly. In this case, as stated above, the lasers with a different wavelength are used for reading and recording. In the present invention, the single recording layer of the optical recording media is obtained either by direct disposing it on the substrate or, by providing an internal layer between the substrate and the recording layer. Thus, an adhesive property and mechanical durability are obtained along with a lower heat loss due to the heat distribution in the substrate. Besides, the use of an intermediate layer allows use of solvents, aggressive to the substrate. The recording layer can be covered with a protective layer or with another glued substrate to protect it from outer impacts, thus improving its stability.

In the present invention, a multilayer disc for three-dimensional optical memory with fluorescent reading is obtained by consecutive bonding of the above single-layer discs one to another so that the active recording layers alternate the inactive separating layers of the substrate. The glue used for obtaining a multilayer optical disc will provide good adhesion of the bonded surfaces and no contraction, which do not worsen the characteristics of recording layers and signal-to-noise ratios, which are transparent for the laser wavelength and fluorescent light. Examples of such glue include UV-hardened optical glue of 3–92, UV-71, UV-69, UV-74, J-91, VTC-2, SK-9 types ("Catalog of Summers laboratories").

The multilayer's disc recording is provided by a consecutive scanning of every recording layer by a focused laser beam. The same way the reading of the recorded information is made.

EXAMPLE 1

To obtain the recording layer medium, the ethanol and ethyl cellosolve mixture solution (1:1) was prepared containing: 1% nitrocellulose, 0.013% oxazine 725 perchlorate (Exciton, Inc.) and dioctyl phthalate 0.2%. The compound solvent was filtered, deposited on a polycarbonate disc and dried to form a recording layer with 500 nm thickness.

EXAMPLE 2

To obtain the recording layer medium, the ethanol and ethyl cellosolve mixture solution (1:1) was prepared containing: 1% nitrocellulose, 0.039% oxazine 725 perchlorate (Exciton, Inc.) and dioctyl phthalate 0.2%. The compound solvent was filtered, deposited on a polycarbonate disc and dried to form a recording layer with 300 nm thickness.

EXAMPLE 3

To obtain the recording layer medium, the ethanol and ethyl cellosolve mixture solution (1:1) was prepared containing: 1% nitrocellulose, 0.078% oxazine 725 perchlorate (Exciton, Inc.) and dioctyl phthalate 0.2%. The compound solvent was filtered, deposited on a polycarbonate disc and dried to form a recording layer with 200 nm thickness.

EXAMPLE 4

To obtain the recording layer medium, the ethanol and ethyl cellosolve mixture solution (1:1) was prepared containing: 1% nitrocellulose, 0.013% HIDC (Exciton, Inc.) and dioctyl phthalate 0.2%. The compound solvent was filtered, deposited on a polycarbonate disc and dried to form a recording layer with 500 nm thickness.

EXAMPLE 5

To obtain the recording layer medium, the ethanol and ethyl cellosolve mixture solution (1:1) was prepared containing: 1% nitrocellulose, 0.039% HIDC (Exciton, Inc.) and dioctyl phthalate 0.2%. The compound solvent was filtered, deposited on a polycarbonate disc and dried to form a recording layer with 300 nm thickness.

EXAMPLE 6

To obtain the recording layer medium, the ethanol and ethyl cellosolve mixture solution (1:1) was prepared containing: 1% nitrocellulose, 0.078% HIDC (Exciton, Inc.) and dioctyl phthalate 0.2%. The compound solvent was filtered, deposited on a polycarbonate disc and dried to form a recording layer with 300 nm thickness.

EXAMPLE 7

To obtain the recording layer medium, the ethanol and ethyl cellosolve mixture solution (1:1) was prepared containing: 1% nitrocellulose, 0.013% 3,3,3'3' tetra methyl 1,1'-diphenylindodicarbocyanine Perchlorate and dioctyl phthalate 0.2%. The compound solvent was filtered, deposited on a polycarbonate disc and dried to form a recording layer with 500 nm thickness.

EXAMPLE 8

To obtain the recording layer medium, the ethanol and ethyl cellosolve mixture solution (1:1) was prepared containing: 1% nitrocellulose, 0.039% 3,3,3'3' tetra methyl 1,1'-diphenylindodicarbocyanine Perchlorate and dioctyl phthalate 0.2%. The compound solvent was filtered, deposited on a polycarbonate disc and dried to form a recording layer with 400 nm thickness.

EXAMPLE 9

To obtain the recording layer medium, the ethanol and ethyl cellosolve mixture solution (1:1) was prepared containing: 1% nitrocellulose, 0.078% 3,3,3'3' tetra methyl-1,1'-diphenylindodicarbocyanine Perchlorate and dioctyl phthalate 0.2%. The compound solvent was filtered, deposited on a polycarbonate disc and dried to form a recording layer with 400 nm thickness.

EXAMPLE 10

To obtain the recording layer medium, the ethanol and ethyl cellosolve mixture solution (1:1) was prepared containing: 1% nitrocellulose, 0.013% 3,3,3'3' tetra methyl-1,1'-dibutyl-4,4,4',5'-dibenzoindo-dicarbocyanine Perchlorate and dioctyl phthalate 0.2%. The compound solvent was filtered, deposited on a polycarbonate disc and dried to form a recording layer with 500 nm thickness.

EXAMPLE 11

To obtain the recording layer medium, the ethanol and ethyl cellosolve mixture solution (1:1) containing: 1% nitrocellulose, 0.039% 3,3,3'3' tetramethyl-1,1'-dibutyl-4,4,4',5'-dibenzoindo-dicarbocyanine perchlorate and dioctyl phthalate 0.2%. The compound solvent was filtered, deposited on a polycarbonate disc and dried to form a recording layer with 300 nm thickness.

EXAMPLE 12

To obtain the recording layer medium, the ethanol and ethyl cellosolve mixture solution (1:1) was prepared containing: 1% nitrocellulose, 0.078% 3,3,3'3' tetra methyl-1,1'-dibutyl-4,4,4',5'-dibenzoindo-dicarbocyanine perchlorate and dioctyl phthalate 0.2%. The compound solvent was filtered, deposited on a polycarbonate disc and dried to form a recording layer with 200 nm thickness.

EXAMPLE 13

To obtain the recording layer medium, the ethanol and ethyl cellosolve mixture solution (1:1) was prepared containing: 1% nitrocellulose, 0.013% triethylammonium salt of 1,1-di-γ-sulfopropyl-3,3,3'3' tetramethylindodicarbocyanine and dioctyl phthalate 0.2%. The compound solvent was filtered, deposited on a polycarbonate disc and dried to form a recording layer with 500 nm thickness.

EXAMPLE 14

To obtain the recording layer medium, the ethanol and ethyl cellosolve mixture solution (1:1) was prepared containing: 1% nitrocellulose, 0.039% triethylammonium salt of 1,1-di-γ-sulfopropyl-3,3,3'3' tetramethylindodicarbocyanine and dioctyl phthalate 0.2%. The compound solvent was filtered, deposited on a polycarbonate disc and dried to form a recording layer with 300 nm thickness.

EXAMPLE 15

To obtain the recording layer medium, the ethanol and ethyl cellosolve mixture solution (1:1) was containing: 1% nitrocellulose, 0.078% triethylammonium salt of 1,1-di-γ-sulfopropyl-3,3,3'3' tetramethylindodicarbocyanine and dioctyl phthalate 0.2%. The compound solvent was filtered, deposited on a polycarbonate disc and dried to form a recording layer with 300 nm thickness.

EXAMPLE 16

To obtain the recording layer medium, the ethanol and ethyl cellosolve mixture solution (1:1) was prepared containing: 1% nitrocellulose, 0.013% 3,3,3'3'tetramethyl-1,1'- diphenylindotricarbocyanine Perchlorate and dioctyl phthalate 0.2%. The compound solvent was filtered, deposited on a polycarbonate disc and dried to form a recording layer with 300 nm thickness.

EXAMPLE 17

To obtain the recording layer medium, the ethanol and ethyl cellosolve mixture solution (1:1) was prepared containing: 1% nitrocellulose, 0.039% 3,3,3'3'tetramethyl-1,1'-diphenylindotricarbocyanine Perchlorate and dioctyl phthalate 0.2%. The compound solvent was filtered, deposited on a polycarbonate disc and dried to form a recording layer with 300 nm thickness.

EXAMPLE 18

To obtain the recording layer medium, the ethanol and ethyl cellosolve mixture solution (1:1) was prepared containing: 1% nitrocellulose, 0.078% 3,3,3'3'tetramethyl-1,1'-diphenylindotricarbocyanine Perchlorate and dioctyl phthalate 0.2%. The compound solvent was filtered, deposited on a polycarbonate disc and dried to form a recording layer with 200 nm thickness.

EXAMPLE 19

To obtain the recording layer medium, the ethanol and ethyl cellosolve mixture solution (1:1) was prepared containing: 1% nitrocellulose, 0.013% HITC (Exciton, Inc.) and dioctyl phthalate 0.2%. The compound solvent was filtered, deposited on a polycarbonate disc and dried to form a recording layer with 400 nm thickness.

EXAMPLE 20

To obtain the recording layer medium, the ethanol and ethyl cellosolve mixture solution (1:1) was prepared containing: 1% nitrocellulose, 0.039% HITC (Exciton, Inc.) and dioctyl phthalate 0.2%. The compound solvent was filtered, deposited on a polycarbonate disc and dried to form a recording layer with 300 nm thickness.

EXAMPLE 21

To obtain the recording layer medium, the ethanol and ethyl cellosolve mixture solution (1:1) was prepared containing: 1% nitrocellulose, 0.078% HITC (Exciton, Inc.) and dioctyl phthalate 0.2%. The compound solvent was filtered, deposited on a polycarbonate disc and dried to form a recording layer with 300 nm thickness.

EXAMPLE 22

To obtain the recording layer medium, the ethanol and ethyl cellosolve mixture solution (1:1) was prepared containing: 1% nitrocellulose, 0.013% 3,3,3'3'tetramethyl-1,1'-diphenyl-10,12-dimethylene-11-diphenylaminoindotricarbocyanine Perchlorate and dioctyl phthalate 0.2%. The compound solvent was filtered, deposited on a polycarbonate disc and dried to form a recording layer with 400 nm thickness.

EXAMPLE 23

To obtain the recording layer medium, the ethanol and ethyl cellosolve mixture solution (1:1) was prepared containing: 1% polyvinyl acetate, 0.039% 3,3,3'3'tetramethyl-1,1'-diphenyl-10,12-dimethylene-11-diphenylaminoindotricarbocyanine Perchlorate and dioctyl phthalate 0.2%. The compound solvent was filtered, deposited on a polycarbonate disc and dried to form a recording layer with 500 nm thickness.

EXAMPLE 24

To obtain the recording layer medium, the ethanol and ethyl cellosolve mixture solution (1:1) was prepared containing: 1% nitrocellulose, 0.078% 3,3,3'3'tetramethyl-1,1'-diphenyl-10,12-dimethylene-11-diphenylaminoindotricarbocyanine Perchlorate and dioctyl phthalate 0.2%. The compound solvent was filtered, deposited on a polycarbonate disc and dried to form a recording layer with 500 nm thickness.

EXAMPLE 25

To obtain the recording layer medium, the ethyl cellosolve solution (1:1) was prepared containing: 0.5% polyvinyl acetate and 0.5% nitrocellulose, 0.039% 3,3,3'3'tetramethyl-1,1'-diphenylindotricarbocyanine Perchlorate and dioctyl phthalate 0.2%. The compound solvent was filtered, deposited on a polycarbonate disc and dried to form a recording layer with 500 nm thickness.

EXAMPLE 26

To obtain the recording layer medium, the ethyl cellosolve solution (1:1) was prepared containing: 0.5% polyvinyl acetate and 0.5% nitrocellulose, 0.039% HIDC (Exciton, Inc.) and dioctyl phthalate 0.2%. The compound solvent was filtered, deposited on a polycarbonate disc and dried to form a recording layer with 500 nm thickness. Every optical disc obtained according to examples 1–26 was placed on the rotating table and radiated by focused laser pulses of 1 ns duration, received from a semiconductor laser with 635, 650 or 830 nm wavelength, 10 mW power. For comparison, we took a standard CD-R disc by TDK with ablative recording and reflective reading. An optical microscope was use to follow physical and chemical changes of the layer after recording. This discovered the decoloration of the dye on the studied examples on the irradiated spots. As a result, a fluorescent signal intensity in the recorded spots lowered, while the background fluorescence did not change. The observation showed no change in the geometrical structure of the recording layer. Under the same conditions, the standard CD-R disc was ablatively recorded by thermoperforation. The signal-to-noise ratio on the studied examples was higher than on the CD-R disc and equal to 3–5.

What is claimed is:

1. An optical data recording medium for use in fluorescent WORM discs comprising at least one active layer, said active layer comprising:
    a fluorescent dye capable of absorbing layer radiation and transforming the absorbed light into heat;
    a fluorescent extinguishing component which generates thermal decomposition products;
    a film-forming polymer having high transparency and low heat conductivity and possessing the necessary quantum output of the dye fluorescence;
    wherein said fluorescent extinguishing component is nitrocellulose comprising from about 10.7% to about 12.5% nitrogen and a polymerization rate in the range of from about 150 to 300.

2. The optical data recording medium of claim 1, wherein said fluorescent dye is selected from a group consisting of xanthene dyes of eosine, xanthene dyes of rhodamine, acridine, oxazine, azine, perylene, violanthrone, cyanine, phthalocyanine dyes, indigoide colors and porphyries.

3. The optical data recording medium of claim 1, wherein said fluorescent dye has a monomer structure.

4. The optical data recording medium as in claim 1, wherein said fluorescent dye forms a non-fluorescent dimer to absorb the recording laser radiation and transform the absorbed light power into the heat.

5. The optical data recording medium as in claim 1, wherein said fluorescent dye comprises about 0.1 to 10% by weight of said active layer.

6. The optical data recording medium of claim 1, wherein said nitrocellulose comprises about 10 to 80% by weight of said active layer.

7. The optical data recording medium of claim 1, wherein said nitrocellulose is a lacquer collodion cotton.

8. The optical data recording medium of claim 1, wherein said film forming polymer is selected from a group consisting of cellulose esters, cellulose ethers, vinylic resins, acrylic resins and mixture thereof.

9. The optical data recording medium of claim 8, wherein said cellulose ester is selected from the group consisting of nitrocellulose, cellulose acetate and cellulose acetate butyrate.

10. The optical data recording medium of claim 8, wherein said cellulose ether is selected from the group consisting of methyl cellulose, ethyl cellulose and butyl cellulose.

11. The optical data recording medium of claim 8, wherein said vinylic resin is selected from the group consisting of polyvinyl acetate, polyvinyl butyral, polyvinyl acetyl, polyvinyl alcohol and polyvinyl pyrrolidon.

12. The optical data recording medium of claim 8, wherein said acrylic resin is selected from the group consisting of polymethylmethacrylate, polybutyl acrylate, polymethacrylic acid, polyacryl amid and polyacrylonitrile.

13. The optical data recording medium of claim 1, further comprising a plastifier in the amount of from about 10 to 50% by weight of said active layer.

14. The optical data recording medium of claim 13, wherein said plastifier is selected from the group of consisting of dibutyl phthalate, diethyl phthalate, triphenylphosphate and tricresylphosphate.

15. The optical data recording medium of claim 1, wherein said active layer is from about 100–1000 nm thick.

16. The optical data recording medium of claim 15, wherein the thickness of said active layer ranges from 200 to 500 nm.

17. The optical recording medium of claim 1, wherein said recording medium is a dye-in-polymer medium (DIP) for fluorescent WORM discs.

18. The optical recording medium of claim 1, further including a substrate.

19. The optical recording medium of claim 18, wherein said substrate is transparent.

20. The optical recording medium of claim 17, further including a plurality of active layers.

21. A method of producing a WORM optical disc having at least one active recording layer comprising the steps of:
  forming a plurality of active layers;
  bonding said layers to form a multilayer structure comprising an inactive substrate layer between each active layer; wherein each active layer is formed by mixing a fluorescent dye, a fluorescent-extinguishing component and a film forming polymer;
  dissolving said mixture in a solvent; and
  applying said dissolved mixture onto a substrate.

22. The method of claim 21, wherein said dissolved mixture is applied to the substrate by either spin coating, roller coating or dip coating.

23. The method of claim 21, wherein the solvent is an organic solvent selected from a group consisting of alcohols, ketones, amides, sulfoxides, ethers, esters, halogenated aliphatic hydrocarbons, aromatic solvents and mixtures thereof.

24. The method of claim 21, wherein said solvent is selected from a group consisting of methanol, ethanol, iso-propanol, iso-butanol, tetrafluoro-ethanol, diacetone alcohol, methyl cellosolve, ethyl cellosolve, acetone, methylethylketone, cyclohexanone, N,N-dimethylformamide, N,N-dimethyl-acetamide, dimethyl sulfoxide, tetrahydrofurane, dioxane, ethyl acetate, chloroform, methylene chloride, dichloroethane, toluene, xylene and mixtures thereof.

25. The method of claim 21, wherein said fluorescent dye is selected from a group consisting of xanthene dyes of eosine, xanthene dyes of rhodamine, acridine, oxazine, azine, perylene, violanthrone, cyanine, phthalocyanine dyes, indigoide colors and porphyries.

26. The method of claim 21, wherein said fluorescent-extinguishing component is a nitrocellulose.

27. The method of claim 21, wherein said film forming polymer is selected from a group consisting of cellulose esters, cellulose ethers, vinylic resins, acrylic resins and mixture thereof.

28. The method of claim 21, wherein the said layers are bonded with glue.

29. The method of claim 28, wherein the glue is selected from the group of UV-hardened optical glues taken from the group consisting of 3–92, UV-71, UV-69, UV-74, J-91, VTC-2, SK-9 types.

30. An optical data recording medium for use in fluorescent WORM discs comprising at least one active layer, said active layer comprising:
  a fluorescent dye capable of absorbing laser radiation and transforming the absorbed light into heat;
  a fluorescent extinguishing component which generates thermal decomposition products;
  a film-forming polymer having high transparency and low heat conductivity and possessing the necessary quantum output of the dye fluorescence; wherein said film forming polymer is selected from a group consisting of cellulose ethers, vinylic resins, acrylic resins and mixtures thereof.

31. The optical data recording medium of claim 30, wherein said fluorescent dye is selected from a group consisting of xanthene dyes of eosine, xanthene dyes of rhodamine, acridine, oxazine, azine, perylene, violanthrone, cyanine, phthalocyanine dyes, indigoide colors and porphyries.

32. The optical data recording medium as in claim 30, wherein said fluorescent dye comprises about 0.1 to 10% by weight of said active layer.

33. The optical data recording medium as in claim 30, wherein said cellulose ether is selected from the group consisting of methyl cellulose, ethyl cellulose and butyl cellulose.

34. The optical data recording medium of claim 30, wherein said vinylic resin is selected from the group consisting of polyvinyl acetate, polyvinyl butyral, polyvinyl acetyl, polyvinyl alcohol and polyvinyl pyrrolidon.

35. The optical data recording medium of claim 30, wherein said acrylic resin is selected from the group consisting of polymethylmethacrylate, polybutyl acrylate, polymethacrylic acid, polyacryl amid and polyacrylonitrile.

36. The optical data recording medium of claim 30, further comprising a plastifier in the amount of from about 10 to 50% by weight of said active layer; wherein said plastifier is selected from the group consisting of dibutyl phthalate, diethyl phthalate, triphenylphosphate and tricresylphosphate.

37. The optical data recording medium of claim 30, wherein said active layer is from about 100–1000 nm thick.

38. The optical data recording medium of claim 30, wherein said recording medium is a dye-in-polymer medium (DIP) for fluorescent WORM discs.

39. The optical data recording medium of claim 30, further including a plurality of active layers, each layer being separated by a transparent substrate.

40. An optical data recording medium for use in fluorescent WORM discs comprising at least one active layer, said active layer comprising:

a fluorescent dye capable of absorbing laser radiation and transforming the absorbed light into heat;

a fluorescent extinguishing component which generates thermal decomposition products;

a film-forming polymer having high transparency and low heat conductivity and possessing the necessary quantum output of the dye fluorescence; and further comprising a plastifier in the amount of from about 10 to 50% by weight of said active layer;

said plastifier is selected from the group of consisting of dibutyl phthalate, diethyl phthalate, triphenylphosphate and tricresylphosphate.

41. The optical data recording medium of claim 40, wherein said fluorescent dye is selected from a group consisting of xanthene dyes of eosine, xanthene dyes of rhodamine, acridine, oxazine, azine, perylene, violanthrone, cyanine, phthalocyanine dyes, indigoide colors and porphyries.

42. The optical data recording medium of claim 40, wherein said active layer is from about 100–1000 nm thick.

43. The optical data recording medium of claim 40, wherein said recording medium is a dye-in-polymer medium (DIP) for fluorescent WORM discs.

44. The optical data recording medium of claim 43, further including a plurality of active layers, each layer is separated by a transparent substrate layer.

* * * * *